United States Patent
Nemeth (10) Patent No.: US 11,919,356 B2
(45) Date of Patent: Mar. 5, 2024

(54) DRIVE UNIT OF A VEHICLE AND A METHOD FOR LEVELLING A VEHICLE

(71) Applicant: KNORR-BREMSE Systeme fuer Nutzfahrzeuge GmbH, Munich (DE)

(72) Inventor: Huba Nemeth, Budapest (HU)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 231 days.

(21) Appl. No.: 17/428,085

(22) PCT Filed: Jan. 22, 2020

(86) PCT No.: PCT/EP2020/051472
§ 371 (c)(1),
(2) Date: Aug. 3, 2021

(87) PCT Pub. No.: WO2020/160900
PCT Pub. Date: Aug. 13, 2020

(65) Prior Publication Data
US 2022/0126643 A1     Apr. 28, 2022

(30) Foreign Application Priority Data
Feb. 4, 2019   (EP) .................................. 19155216

(51) Int. Cl.
*B60G 17/0195*   (2006.01)
*B60K 7/00*   (2006.01)
*B60K 1/00*   (2006.01)

(52) U.S. Cl.
CPC ........ *B60G 17/0195* (2013.01); *B60K 7/0007* (2013.01); *B60G 2204/46* (2013.01); *B60G 2300/026* (2013.01); *B60G 2300/50* (2013.01); *B60G 2500/30* (2013.01); *B60K 2001/001* (2013.01)

(58) Field of Classification Search
CPC ............ B60G 17/0195; B60G 2204/46; B60G 2500/30; B60G 17/00; B60K 7/0007
See application file for complete search history.

(56) References Cited

U.S. PATENT DOCUMENTS

| | | | |
|---|---|---|---|
| 7,497,285 B1 * | 3/2009 | Radev ...................... | B60K 6/52 180/65.23 |
| 10,058,031 B1 * | 8/2018 | Brown .................... | B60K 17/14 |
| 2006/0017240 A1 | 1/2006 | Laurent et al. | |

(Continued)

FOREIGN PATENT DOCUMENTS

| AU | 2007234883 A1 * | 10/2008 | ............. B60G 11/15 |
|---|---|---|---|
| CA | 2838592 A1 * | 12/2012 | ............. B60K 11/02 |

(Continued)

OTHER PUBLICATIONS

Laurent, EP-1616731-A1, Jan. 2006, Machine Translation of Specification.*

(Continued)

*Primary Examiner* — Paul N Dickson
*Assistant Examiner* — Matthew Joseph Ganci
(74) *Attorney, Agent, or Firm* — Crowell & Moring LLP (57) ABSTRACT

A drive unit for a commercial vehicle includes at least one electric motor; and means for levelling the axle driven by the at least one electric motor.

11 Claims, 5 Drawing Sheets

(56) References Cited

U.S. PATENT DOCUMENTS

| | | | |
|---|---|---|---|
| 2007/0251742 A1* | 11/2007 | Adams, III | B60K 6/52 |
| | | | 180/338 |
| 2009/0071743 A1 | 3/2009 | Gashi | |
| 2018/0105065 A1* | 4/2018 | Ide | H02P 29/032 |
| 2019/0023115 A1* | 1/2019 | Mackenzie | B60K 6/387 |
| 2020/0003287 A1 | 1/2020 | Holzberger et al. | |

FOREIGN PATENT DOCUMENTS

| | | | | |
|---|---|---|---|---|
| CN | 206589600 U | | 10/2017 | |
| CN | 107933305 A | * | 4/2018 | B60G 17/00 |
| CN | 108602410 A | | 9/2018 | |
| DE | 10 2017 109 147 A1 | | 8/2018 | |
| EP | 1616731 A1 | * | 1/2006 | B60G 17/015 |
| EP | 2 127 918 A1 | | 12/2009 | |
| FR | 2 873 061 A1 | | 1/2006 | |
| FR | 2 888 553 A1 | | 1/2007 | |

OTHER PUBLICATIONS

Yang, CN-107933305-A, Apr. 2018, Machine Translation of Specification.*
International Search Report (PCT/ISA/210) issued in PCT Application No. PCT/EP2020/051472 dated May 27, 2020 (two (2) pages).
Written Opinion (PCT/ISA/237) issued in PCT Application No. PCT/EP2020/051472 dated May 27, 2020 (six (6) pages).
European Office Action issued in European Application No. 19 155 216.5 dated Aug. 5, 2022 (eight (8) pages).
Chinese-language Office Action issued in Chinese Application No. 202080012518.0 dated Mar. 29, 2023 with English translation (11 pages).

* cited by examiner

DRIVE UNIT OF A VEHICLE AND A METHOD FOR LEVELLING A VEHICLE

BACKGROUND AND SUMMARY OF THE INVENTION

The present invention relates to a drive unit for a vehicle and to a method for levelling the vehicle and, in particular, to an integrated electric levelling for electronic axles of commercial vehicles, wherein the axle can be a rigid vehicle axle or an axle of an independent suspension.

Commercial vehicles often need a levelling. For example, there is a demand to compensate for load changes on driven axles or to lower a tractor to couple a trailer. Likewise, the vehicle level should be adjusted to an external dock or an entry level should be lowered (for example for buses). Conventional levelling is typically realized by so-called air springs which use compressed air available on commercial vehicles to move the spring to lift or lower the corresponding axle relative to the chassis of the vehicle.

The compressed air in conventional commercial vehicles may be generated using at least some power of the propulsion engines such as an internal combustion engine. An advantage of compressed air is that it can be easily transmitted to the respective axle—even though the respective engine is separated from the axle. Similarly, the torque of the propulsion engine can be transmitted, for example, by a cardan shaft to a differential gear on the axle. Hub shafts can then drive the wheel hubs and the rim.

In the future, electric commercial vehicles will become more and more widespread, wherein the electric driving engine may even be integrated into the driven axle. If one still wishes to rely on the conventional infrastructure for the vehicle levelling, there would be a need to generate compressed air based on electric engines. However, electric compressors with sufficient power are expensive and less effective. Therefore, there is a demand for replacing the conventional compressed air systems, which would also significantly lower the noise level that is typical for these systems.

Thus, there is a demand for a system which enables the levelling functionality—in particular on driven axles—based on a fully electrified source of energy and without the need for any compressed air infrastructure.

At least some of the problems are overcome by a drive unit or a method according to the independent claims. The dependent claims refer to further advantageous realizations of the subject matter of the independent claims.

The present invention relates to a drive unit for a commercial vehicle. The drive unit includes at least one electric motor and means for levelling the axle, which are driven or powered by the at least one electric motor.

Optionally, the means for levelling include at least one self-locking levelling mechanism actuated by the electric motor. The self-locking mechanism may be configured to prevent any levelling in case of power failure.

Optionally, the drive unit further comprises a vehicle propulsion engine, wherein the electric motor is independent of the vehicle propulsion engine. However, the electric motor may also be configured to contribute to the vehicle propulsion. Optionally, only a single electric motor may be used for the propulsion (via a differential gearbox) and for the levelling function, wherein a gearbox may implement a switch between propulsion and levelling.

Optionally, the commercial vehicle includes a wheel hub and a gearbox may be arranged between the electric motor and the wheel hub. The gearbox may include a first output to drive the wheel hub and a second output to actuate the levelling. In addition, the gearbox may include a clutch configured to activate/deactivate the second output for levelling the axle.

Optionally, the vehicle including at least one wheel brake and the gearbox may be configured to activate the second output for levelling only if the at least one wheel brake is engaged.

Optionally, the drive unit includes a unit for controlling the levelling and a propulsion engine of the vehicle. Hence, there can be an integrated control unit for controlling both the levelling and the propulsion engine. The unit may include a power management.

Optionally, the drive unit includes a support structure for a single wheel to enable an independent suspension. The drive unit may also include a support structure for two opposite wheels to enable a rigid vehicle axle.

The present invention relates further to a vehicle, in particular a commercial vehicle, with a drive unit as described before, wherein the axle is a rigid axle or an axle of an independent suspension or a part thereof.

The present invention relates further to a method for levelling a vehicle with a drive unit that includes at least one electric motor, wherein the drive unit can be a rigid axle or an axle of an independent suspension. The method includes: controlling the at least one electric motor of the drive unit to level the axle relative to a chassis of the vehicle. The method may further include levelling the vehicle with the same or a different electric engine as driving the vehicle.

Embodiments of the present invention solve at least some of the above-mentioned problems by electrically actuated levelling which are integrated into an electrically-driven commercial vehicle axle, which can be rigid or can be part of an independent suspension that is secured to a vehicle chassis. The electric power may be taken from the power supply available to the drive unit and used for the levelling of the axle.

This function is in particular implemented in axles that are driven, but embodiments shall not be limited to this application. Other axles may include an additional power supply to actuate the electric motors used for levelling. Hence, according to embodiments, the levelling function may be realized with independent actuator motors or with the propulsion motor(s). Such a sharing can be realized through an exemplary gearbox installed between the drive motor(s) and the wheel hubs. If more than one electric motor is available on the axle, a sidewise level control may also be implemented. Unlike the case for the conventional air springs, the levelling and spring functionality of the suspension is, according to embodiments, clearly separated. Thus, the levelling is applicable even without any type of springs.

Such axles are known as electric or e-axles and may have one electric motor with a differential gear. They may have two separate motors for each wheel, in which case no differential gear is needed.

Some examples of the systems and/or methods will be described in the following by way of examples only, and with respect to the accompanying figures.

DETAILED DESCRIPTION OF THE DRAWINGS

Figure 1:
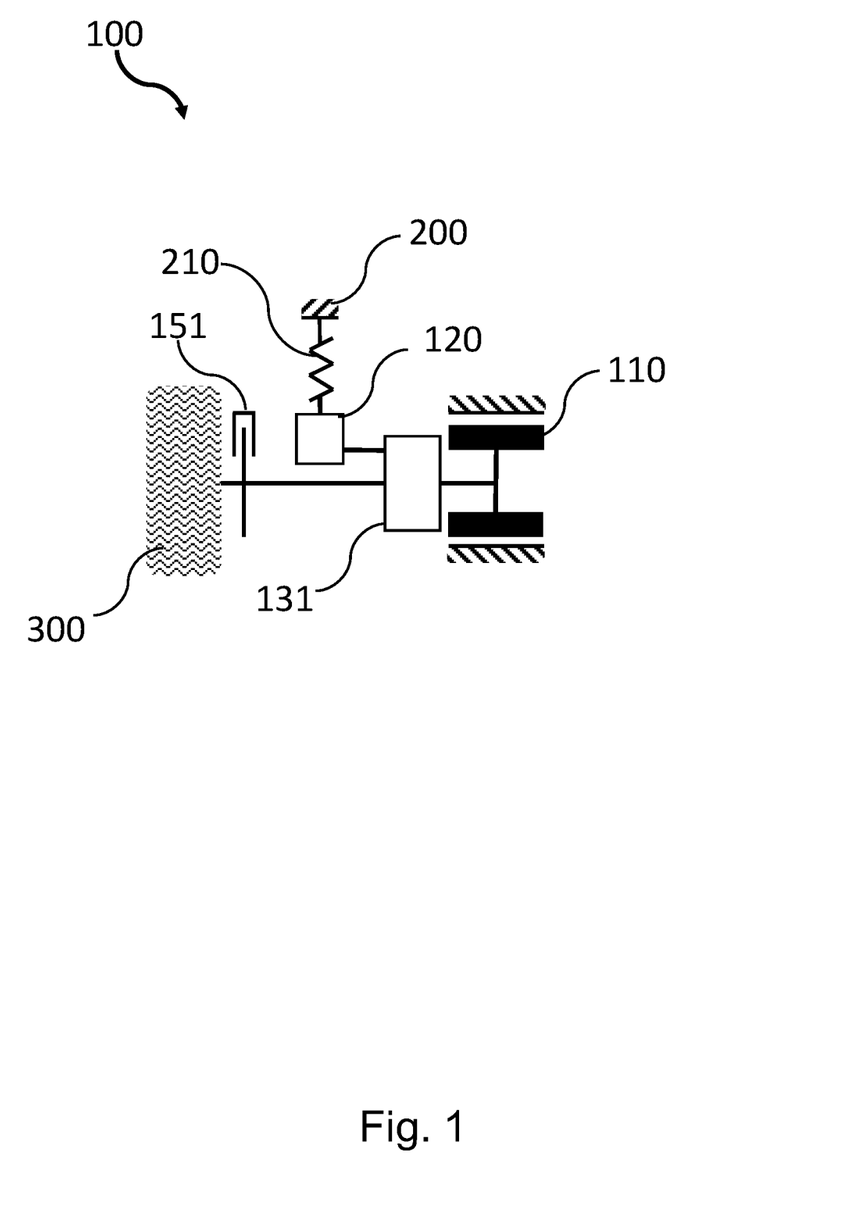
FIG. 1 depicts an electric drive unit according to an embodiment of the present invention.

FIG. 1 depicts a vehicle drive unit according to an embodiment of the present invention. The drive unit 100 includes one electric motor 110 and means for levelling 120 the axle relative a vehicle chassis 200. The electric motor 110 couples to a gearbox 131 to use it for propulsion and for levelling. The gearbox 131 may include two outputs and a switch or a clutch to couple the means for levelling 120 on one output or a vehicle wheel 301 on the other output to the electric motor 110. The means for levelling 120 couple to the chassis 200 or another supporting structure via a spring 210.

In addition, a brake unit 151 may be provided as part of the axle to brake the vehicle wheel 300. The means for levelling 120 may include a mechanism to change the relative distance between the chassis 200 and the wheel 300.

The drive unit 100 may be part of an independent suspension or of rigid axle. The depicted drive unit 100 may in particular an electric drive axle driven by the electric motor 113. According to further embodiments, independent actuation motors may be provided, one electric motor for the levelling and one for the propulsion.

Figure 2:
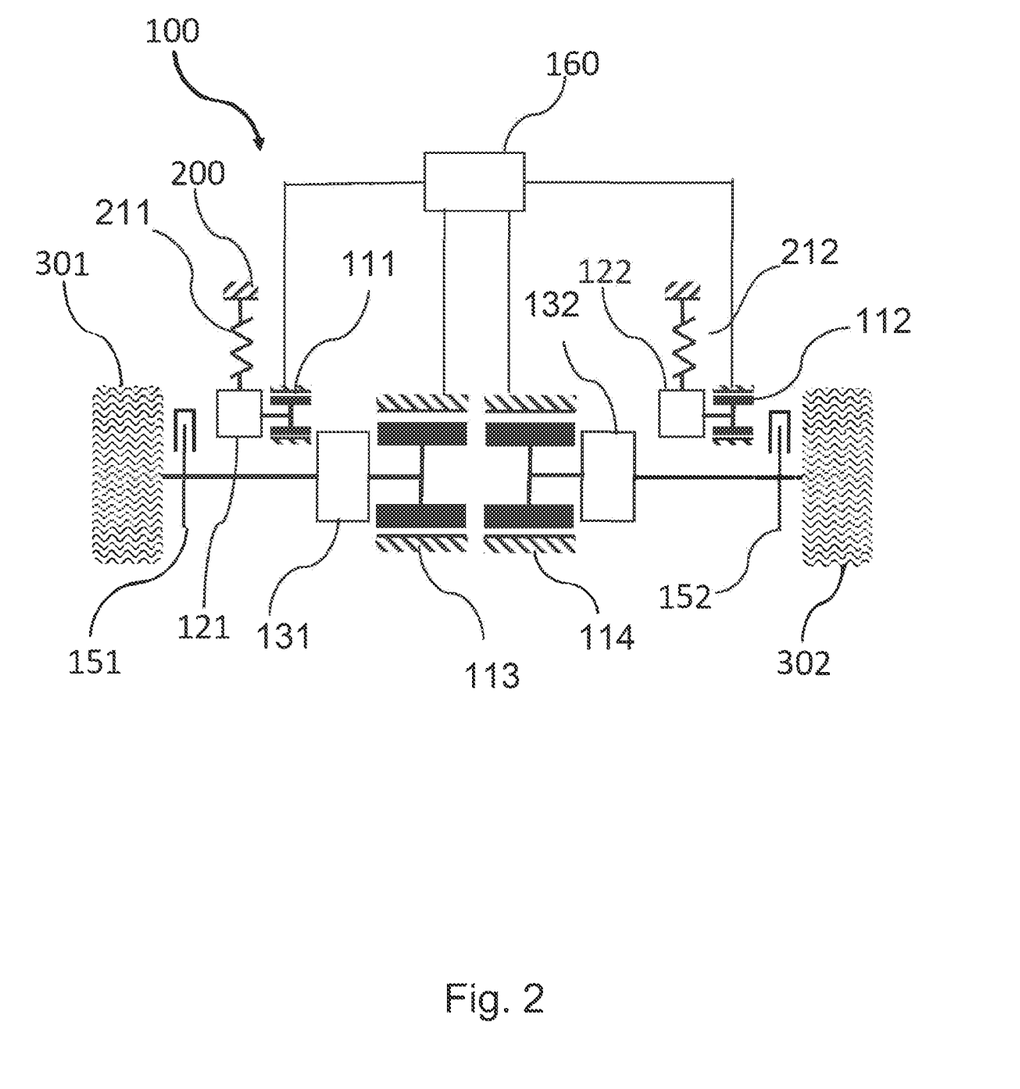
FIG. 2 depicts an electric drive unit with dual propulsion electric motors and independent electric motors for levelling according to a further embodiment.

FIG. 2 depicts an embodiment of the drive unit 100 which includes a first, a second, a third and a fourth electric motor 111, 112, 113, 114. In addition, a first levelling means 121 and a second levelling means 122 are available on each side of the commercial vehicle. The first levelling means 121 is connected to a first spring 211 that connects the first levelling means 121 to the vehicle chassis 200. The second levelling mechanism 122 is connected to a second spring 212 which in turn is connected to the vehicle chassis 200.

According to this embodiment, the first electric motor 111 drives the first levelling means 121 and the second electric motor 112 drives the second levelling means 122. The rotation of the actuator motors (the first and second electric motors 111, 112) is transferred to respective levelling mechanisms 121, 122 that translates the motor rotational position to a variable axle support offset of the respective springs 211, 212 coupled to the axle. The other ends of the springs 211, 212 are suspended to the vehicle chassis 200.

In addition, a third electric motor 113 and a fourth electric motor 114, which are independent from the first and second electric motor 111, 112, are available as combustion engines to drive the wheels 301, 302 on each side of the vehicle. On the left-hand side, between the third electric motor 113 and a first wheel 301, a first gearbox 131 and a first brake 151 are arranged along the drive line. Similarly, on the right-hand side, between the fourth electric motor 114 and a second wheel 302 of the vehicle a second gearbox 132 and a second brake 152 are arranged along the drive line. Therefore, according to the embodiment of FIG. 2, the drive electric motors 113, 114 are separate electric motors from the first electric motor 111 and the second electric motor 112 that drive the means for levelling 121, 122.

It is understood that also in the embodiment of FIG. 1 independent electric motors 111, 113 may be used for propulsion and levelling as depicted in FIG. 2 (e.g. for driving and levelling the left-hand side of the vehicle).

According to the present invention, the levelling means 121, 122 may be integrated into an electrically driven commercial vehicle drive unit 100 (a so-called e-axle) and FIG. 2 shows an exemplary rigid axle with a dual motor drive axle with independent actuators 111, 112 for providing levelling on each side of the vehicle. The further two propulsion electric motors 113, 114 drive the vehicle through appropriate gearboxes 131, 132 independently from levelling. However, the gearboxes 131, 132 may be configured to allow the levelling only at standstill.

Furthermore, all or at least some of the actuator motors 111, 112 and driving motors 113, 114 may share a common control and power electronics 160. Therefore, the controlling can be integrated into one unit 160 to switch between the levelling and propulsion. The electronic control unit 160 may not only control the drive electric motors 113, 114, but also the actuation electric motors 111, 112 used for actuating the levelling mechanisms 121, 122.

Figure 3:
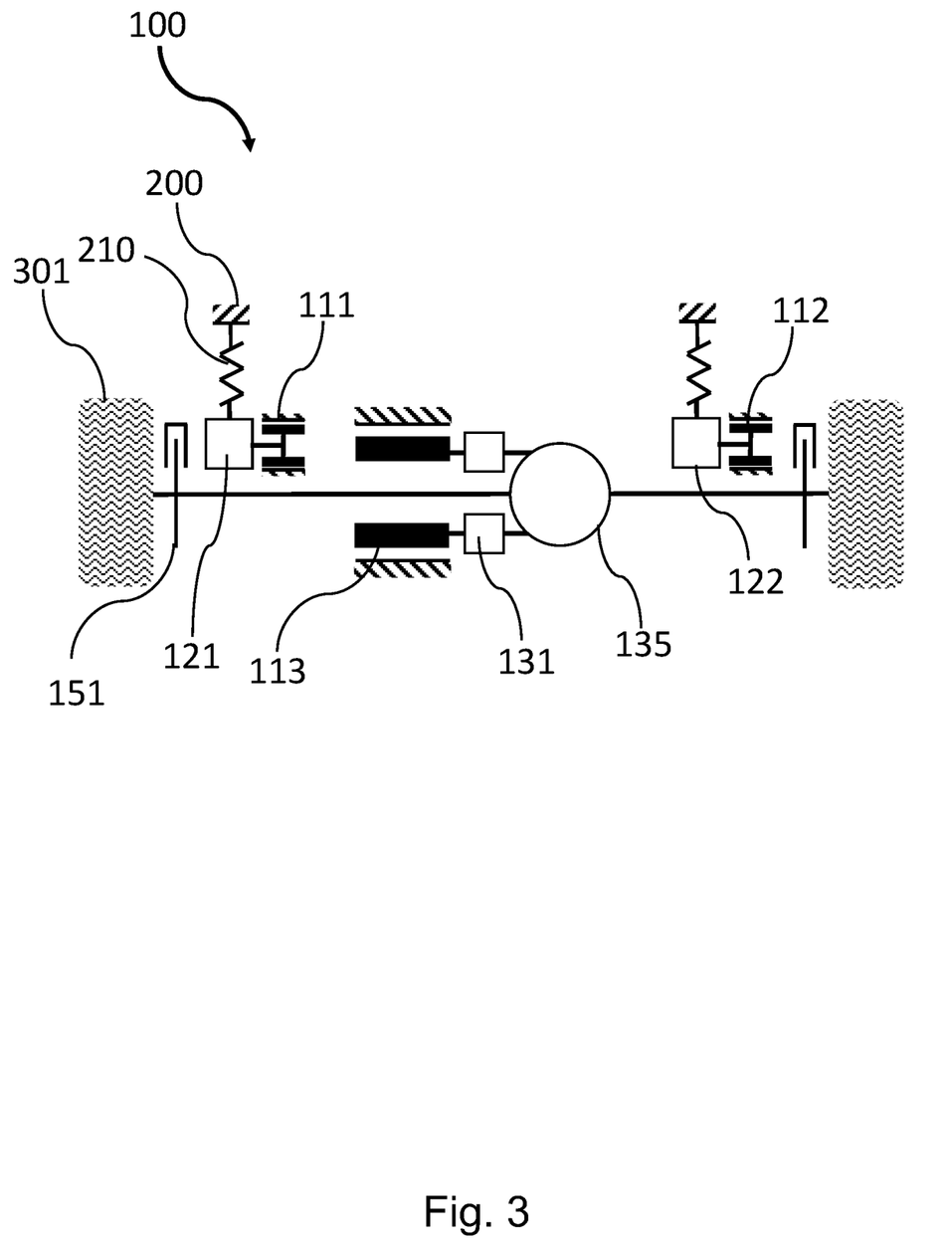
FIG. 3 depicts an electric drive unit with a single propulsion electric motor and independent actuation motors for levelling according to yet another embodiment.

FIG. 3 depicts another embodiment in which one propulsion electric motor 113 is connected to a differential gear 135 via a gearbox 131, whereas the levelling is implemented by independent actuation motors 111, 112 as in FIG. 2. Again, a first and a second levelling means 121, 122 are actuated by the first and second actuation motor 111, 112 to lower/lift the axle 100 relative to the chassis 200.

Figure 4:
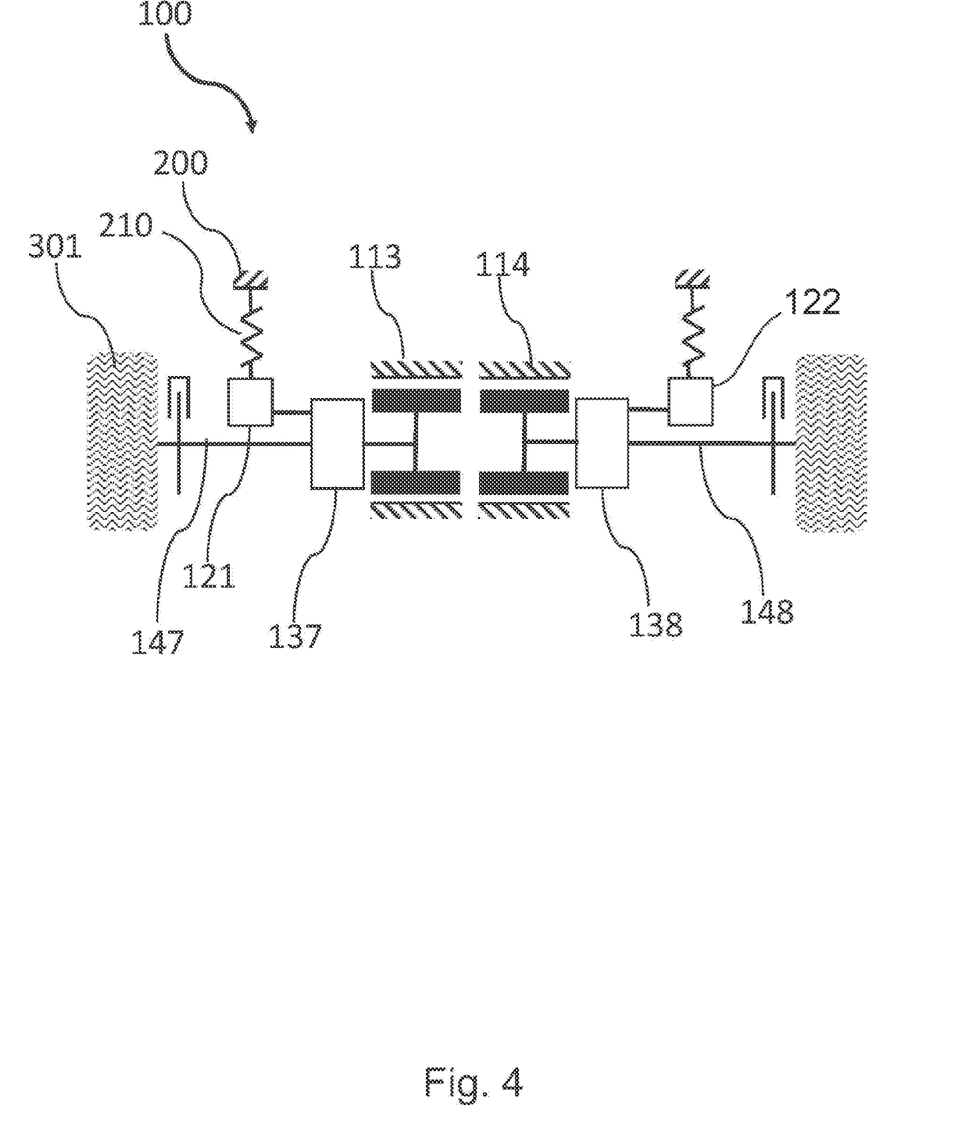
FIG. 4 depicts an electric drive unit with dual propulsion electric motors which are shared for levelling according to yet another embodiment.

FIG. 4 depicts yet another embodiment, wherein dual drive electric motors 113, 114 are likewise used for actuating the levelling mechanisms 121, 122. To achieve this purpose, the gearboxes 131, 132 of the embodiment of FIG. 2 are each replaced by other gearboxes 137, 138 which on one side are driven by the respective driving electric motor 113, 114, but include on the other side two outputs: a first output for the respective drive line 147, 148 and a second output for driving the respective levelling mechanism 121, 122.

Hence, in this embodiment the dual propulsion motors 113, 114 are shared for the propulsion and the levelling function. Since the levelling is normally not needed during the motion of the vehicle, the propulsion motors 113, 114 can be used for levelling while the vehicle is at a standstill, where the propulsion motors 113, 114 may transmit the needed power to the levelling mechanisms 121, 122. To enable this, a switch may be available to switch the output towards the driven wheels 301, 302 or the levelling mechanisms 121, 122. Such switch functions can be implemented by a single input and dual output split gearbox and may be controlled using a vehicle control unit 160 (as shown in FIG. 2). A clutch may also be included and the selection between the two outputs of the gearboxes 137, 138 can be realized by an electrically actuated clutch.

According to further embodiments and to ensure that the lifting is only carried out at a standstill, the first output of the gearbox 137, 138 toward the drive lines 147, 148 may actively be braked (for example by a parking brake). It may thus be possible to use a reaction torque by the wheel brakes for enabling an output torque for the levelling mechanisms 121, 122. In other word, only if a brake torque is present, the levelling mechanisms 121, 122 can be activated.

All other components can be arranged in the same way as in the embodiment of FIG. 2. A repetition is not needed here.

Figure 5:
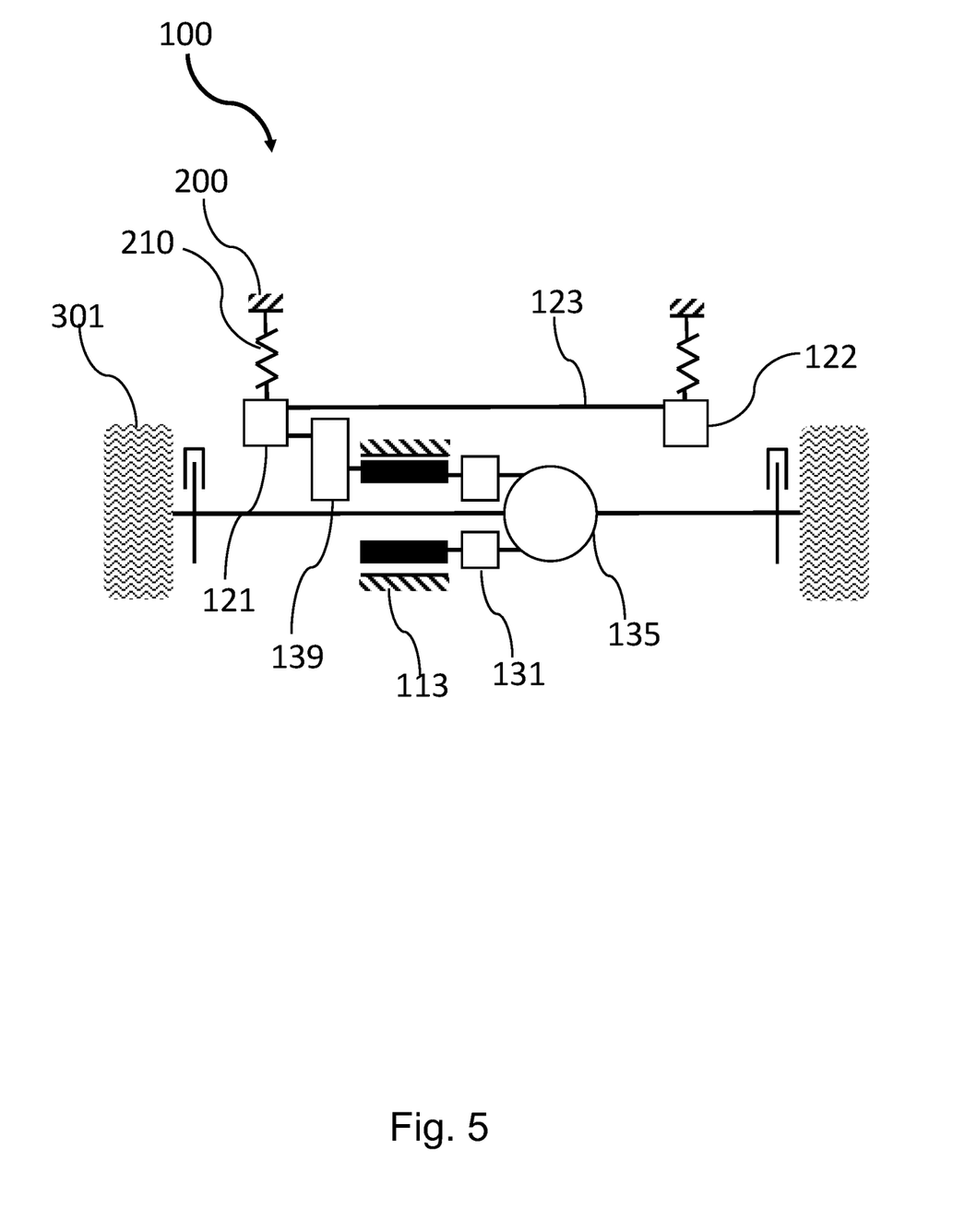
FIG. 5 depicts yet another embodiment for an electric drive unit with a single propulsion electric motor shared for levelling of the vehicle.

FIG. 5 depicts yet another embodiment, which represents a similar realization to the embodiment of FIG. 3 in that only single drive motor 113 is available that again couples through a gearbox 131 and a differential gear 135 to the wheels 301, 302. However, in this embodiment, the single drive electric motor 113 is additionally used for the levelling mechanisms 121, 122. For this, another levelling gearbox 139 transmits a torque from the driving electric motor 113 to the first levelling mechanism 121. The first levelling mechanism 121 may be configured to transmit also a torque to the second levelling mechanism 122 (e.g. via a connection 123). Thereby, the single propulsion electric motor 113 can be used for the levelling actuation by using the dedicated gearbox 139 to transmit the drive power from the electric motor 113 to the levelling mechanisms 121, 122. Again, a switch may be included to enable the levelling only in case the vehicle is at standstill or upon an explicit control signal provided by a vehicle control unit (not shown in FIG. 5).

This lifting mechanism may be used in particular in cases where both sides are lifted in the same way (e.g. when coupling a tractor to a trailer).

Moreover, the lifting mechanisms 121, 122 in all embodiments may include a self-locking to support the vehicle—even if the lifting actuation is switched off. This self-locking mechanism may for example include a worm gearbox or any other latching mechanism that prevents an unintentional lowering of the vehicle. In particular, if there is a failure in the power supply the levelling mechanisms 121, 122 may be blocked to prevent an unintentional actuation of the levelling.

Further advantageous embodiments relate to at least one of the following.

A commercial vehicle drive unit equipped with at least one electric motor, wherein the electric motor is configured to realize the levelling actuation of the axle.

The commercial vehicle drive unit may further be characterized in that the electric motor actuates at least one levelling mechanism.

The commercial vehicle drive unit may further be characterized in that the levelling mechanism is self-locking.

The commercial vehicle drive unit may further be characterized in that the electric motor is independent of the vehicle propulsion.

The commercial vehicle drive unit may further be characterized in that a propulsion electric motor is shared for the levelling actuation.

The commercial vehicle drive unit may further be characterized in that a gearbox is located within the axle between the propulsion e-motor and the wheel hub, which has a first output to drive the wheel and a second output to actuate the levelling.

The commercial vehicle drive unit may further be characterized in that the second output of the gearbox for the levelling can be activated by a clutch.

The commercial vehicle drive unit may further be characterized in that the second output of the gearbox for the levelling can be activated only if the wheel brakes are active.

The commercial vehicle drive unit may further be characterized in that the control and power electronics for the propulsion and the levelling functions are shared and/or integrated.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature described in one embodiment may also be realized in other embodiments. Such combinations are covered by the disclosure herein unless it is stated that a specific combination is not intended.

LIST OF REFERENCE SIGNS 100 drive unit for a (commercial) vehicle
111, 112 electric motor(s)/actuation motor(s) for levelling
113, 114 propulsion electric motor(s)
120 means for levelling
121, 122 levelling mechanisms
131, 132, . . . gearboxes
151, 152, . . . wheel brakes
160 electronic control unit
200 chassis of the vehicle
211, 212 springs
301, 302 wheels

The invention claimed is:

1. A drive unit for a commercial vehicle, comprising:
at least one electric motor;
means for levelling an axle driven by the at least one electric motor; and
a gearbox arranged between the electric motor and a wheel hub of the commercial vehicle, wherein the gearbox comprises a first output to drive the wheel hub and a second output to actuate levelling.

2. The drive unit according to claim 1, wherein
the means for levelling comprises at least one self-locking levelling mechanism actuated by the at least one electric motor.

3. The drive unit according to claim 1, further comprising:
a vehicle propulsion engine, wherein
the at least one electric motor is independent of the vehicle propulsion engine.

4. The drive unit according to claim 1, wherein
the at least one electric motor is configured to contribute to a vehicle propulsion.

5. The drive unit according to claim 1, wherein
the gearbox comprises a clutch configured to activate the second output for levelling the axle.

6. The drive unit according to claim 1, further comprising:
at least one wheel brake, wherein
the gearbox is configured to activate the second output for levelling only when the at least one wheel brake is engaged.

7. The drive unit according to claim 1, further comprising:
a control unit configured to control the levelling and a propulsion of the vehicle.

8. The drive unit claim 1, further comprising:
a support structure for a single wheel to enable an independent suspension or for two opposite wheels to enable a rigid vehicle axle.

9. A commercial vehicle, comprising:
a drive unit according to claim 1, wherein
the drive unit is part of a rigid axle or an axle of an independent suspension of the commercial vehicle.

10. A method for levelling a vehicle, the method comprising:
providing a drive unit that includes at least one electric motor and a gearbox arranged between the electric motor and a wheel hub of the vehicle, wherein the gearbox comprises a first output to drive the wheel hub and a second output to actuate the levelling, wherein the drive unit is included in a rigid axle or an axle of an independent suspension; and
controlling the at least one electric motor of the drive unit to level the vehicle.

11. The method of claim 10, wherein the vehicle comprises a vehicle propulsion engine, the method further comprising:

levelling the vehicle using the vehicle propulsion engine.

* * * * *